United States Patent [19]

Chen et al.

[11] Patent Number: 5,736,907

[45] Date of Patent: Apr. 7, 1998

[54] MULTIPLE-FREQUENCY AUTOTRACK FEED FOR WIDEBAND COMMUNICATION SYSTEMS

[75] Inventors: C. Harry Chen, Torrance; John P. Pacente, Norwalk; George H. Simkins, Torrance, all of Calif.

[73] Assignee: TRW Inc., Redondo Beach, Calif.

[21] Appl. No.: 709,442

[22] Filed: Aug. 29, 1996

[51] Int. Cl.[6] .................................................. H01P 5/18
[52] U.S. Cl. ...................................... 333/113; 333/21 R
[58] Field of Search .............................. 333/21 R, 113

[56] References Cited

U.S. PATENT DOCUMENTS

| | | |
|---|---|---|
| 2,748,350 | 5/1956 | Miller .............................. 333/21 R X |
| 4,420,756 | 12/1983 | Hamada et al. ...................... 342/153 |
| 5,410,318 | 4/1995 | Wong et al. .......................... 342/359 |

*Primary Examiner*—Paul Gensler
*Attorney, Agent, or Firm*—Michael S. Yatsko

[57] ABSTRACT

A travelling wave coupler autotracking system 10 controls the pointing of an antenna aboard an orbiting satellite by generating tracking signals covering a wideband frequency. The system 10 comprises a waveguide manifold 22 for exciting circular $TE_{11}$ and $TM_{01}$ modes covering a wideband frequency range, coupling arm waveguides 24, 26 for propagating signals having a phase velocity of $TE_{10}$ mode that is the same as the phase velocity of $TM_{01}$ mode, and couplers 30 for transforming microwave energy of the $TM_{01}$ mode of the circularly polarized microwave signals into $TE_{10}$ modes in the coupling waveguide. The system 10 can further comprise 180°-hybrid 20 for combining the $TE_{10}$ modes in the coupling waveguides in phase and for generating one or more error signals at different frequencies.

15 Claims, 9 Drawing Sheets

MULTIPLE-FREQUENCY AUTOTRACK FEED FOR WIDEBAND COMMUNICATION SYSTEMS

BACKGROUND

The invention relates to antenna tracking systems, and in particular, to a traveling wave coupler used in conjunction with a multimode feed horn.

Space-to-space crosslink and space-to-ground point-to-point satellite communications require narrow beamwidth to obtain high antenna gain. In order to maintain reliable communications, a satellite antenna must be pointed accurately towards a signal source. To achieve accurate pointing, satellites commonly employ autotracking signals related to pointing errors in elevation and azimuth. The tracking signals control a feedback servoloop of the satellite to orient the satellite as required to position the antenna accurately towards the signal source.

Conventional satellite autotracking systems utilize a monopulse-tracking configuration in which a plurality of antennas, feeding a reflector system, develop three tracking signals, namely an azimuth error signal, an elevation error signal, and a sum signal, which are related to pointing accuracy of the satellite antenna. Monopulse tracking systems are well-known and are described in *Radar Handbook* by M. I. Skolnik, Second Edition, McGraw-Hill (1990), hereby incorporated by reference.

Existing autotracking systems for space applications use a single multimode feedhorn in conjunction with a Turnstile Junction (TJ) mode coupler. The multimode feedhorn is designed to support multiple circular waveguide modes. A fundamental circular $TE_{11}$ mode carries a sum radiation pattern used to generate a sum signal and higher order modes, such as $TM_{01}$, $TE_{21}$ and $TE_{01}$, carry a difference radiation pattern used to generate error signals. The mode coupler separates the higher modes from the fundamental modes and thus separate sum and error signals.

A disadvantage of the TJ tracking systems is their narrow operating bandwidth which causes them to track a single frequency only. It is highly desirable to track beacon signals on more than one frequency.

Travelling wave coupler (TWC) systems can be utilized to provide multiple-frequency tracking capability. However, conventional TWCs are unnecessarily long and typically include four or eight arms depending upon whether the source field is linearly or circularly polarized, respectively. The inventors of the present invention resolved the aforementioned shortcomings in U.S. Pat. No. 5,410,318 by providing a single arm TWC to eliminate the need for balancing multiple arms and enhance the performance of a tracking system by eliminating any possible amplitude and phase imbalance. U.S. Pat. No. 5,410,318 is incorporated herein by reference.

A disadvantage of the one-arm TWC is that it must be excessively long for increased sensitivity in detecting weak tracking beacon signals. The tracking signal strength level coupled out of a TWC is proportional to the length of the TWC. With the increasing demand for reduced size and weight of spacecraft payloads, unnecessarily long TWCs are not desirable.

Another disadvantage of one-arm TWCs is that they cannot provide wideband data communication with high polarization purity. This is because circularly polarized data communication signals entering the TWCs are depolarized while propagating through the TWCs. High polarization purity over a wide communication bandwidth is essential in achieving high data rates required of modern communication systems to enhance communication capacity.

There is therefor a need for a travelling wave coupler which allows tracking on multiple frequencies. There is also a need for the travelling wave coupler to provide wideband data communication with high polarization purity with reduced physical length.

SUMMARY

The present invention satisfies these needs. The present invention provides a travelling wave coupler autotracking system for controlling the pointing of an antenna aboard an orbiting satellite by generating tracking signals covering a wideband frequency range. The system comprises: (a) waveguide means having a predetermined propagation length for exciting circular $TE_{11}$ and $TM_{01}$ modes of circularly polarized microwave signals covering a wideband frequency range; (b) coupling waveguide means having a predetermined length for propagating signals having a phase velocity of $TE_{10}$ rectangular waveguide mode that is the same as the phase velocity of $TM_{01}$ mode in the waveguide means; and (c) coupler means for transforming microwave energy of the $TM_{01}$ mode of the circularly polarized microwave signals into $TE_{10}$ modes in the coupling waveguide means; whereby, the system tracks signals covering a wideband frequency range and the overall length of the waveguide means and the coupling waveguide means is reduced in size by the parallel functions of the coupling waveguide means.

Preferably, the waveguide means includes a waveguide manifold, the coupling waveguide means includes a pair of coupling arm waveguides aligned and connected to the waveguide manifold along a portion of the propagation length of the waveguide manifold, and the coupler means includes a pair of couplers located between the waveguide manifold and a corresponding coupling arm waveguide.

The system can further comprise 180°-hybrid means for combining the $TE_{10}$ modes in the coupling arm waveguides in phase and for generating one or more error signals at different frequencies, each error signal including a first hybrid error signal with an azimuth component and a second hybrid error signal with an elevation component 90° or 270° in phase quadrature with the azimuth component.

DRAWINGS

These and other features, aspects and advantages of the present invention will become understood with reference to the following description, appended claims and accompanying drawings where:

DESCRIPTION

Figure 1:
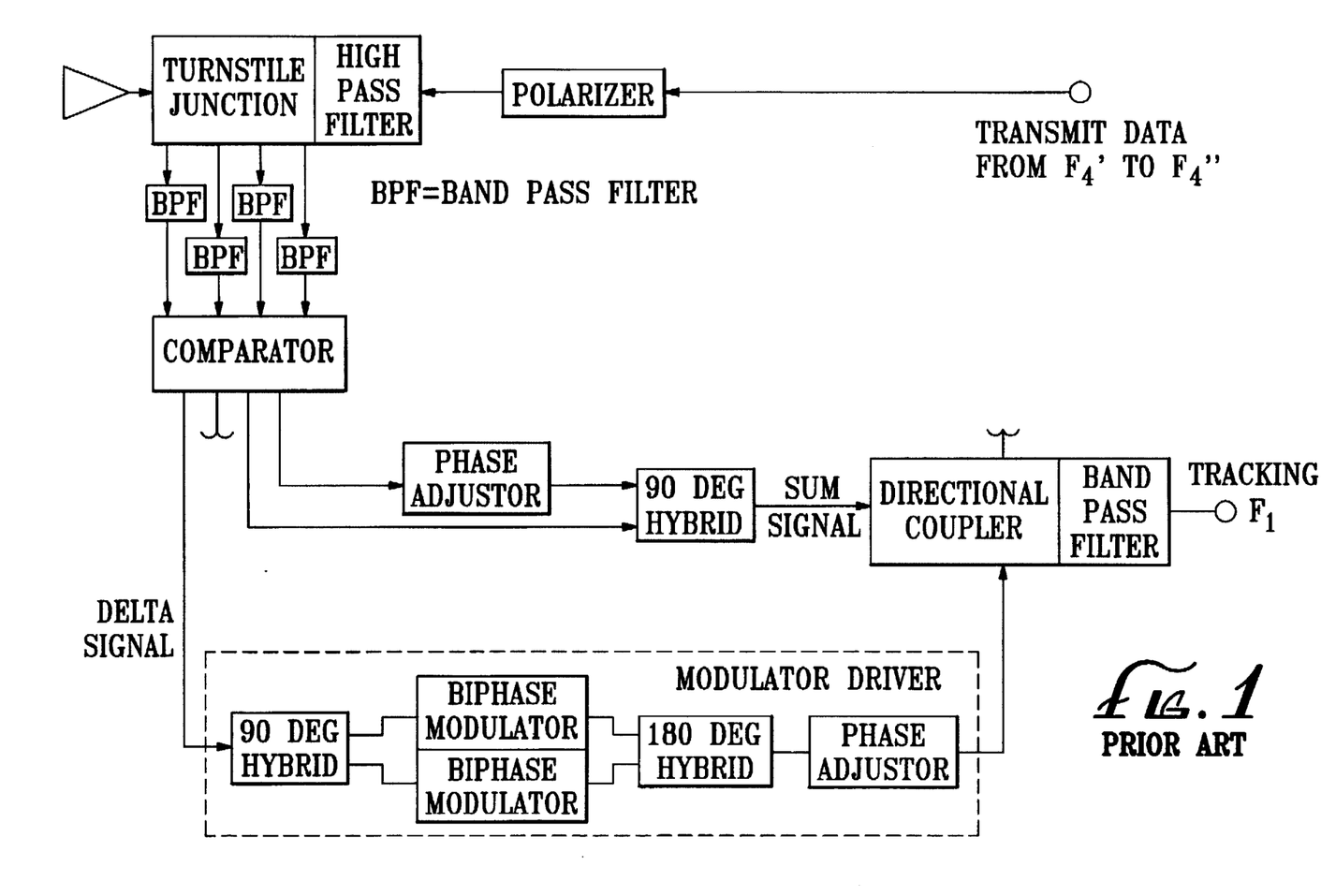
FIG. 1 is a schematic diagram of the feed system of a conventional tracking system having a waveguide manifold and a plurality of side arms.

FIG. 1 is a schematic diagram of the feed system of a conventional tracking system having a waveguide manifold and a plurality of side arms. In this description, alphabetic references have been used to describe the prior art systems in FIGS. 1-2, and numerical references have been used to describe the present invention in FIGS. 3-13. Referring to FIG. 1, the feed system utilizes a turnstile junction (TJ) to extract tracking signals. The feed system tracks only on one V-band frequency F1, and transmits data at frequencies from F4'/F1 of 1.05 to F4"/F1 of 1.13. The tracking signals are extracted from the main manifold of the TJ. The TJ uses a high pass filter to stop the tracking signals from propagating into the rest of the system and diverts them into the side arms. Band pass filters (BPF) are used to stop the data signals from leaking into the side arms.

In operation, when a beacon signal enters the horn, it flows into the turnstile junction. The high pass filter stops the beacon signal from proceeding into the transmit channel. The band pass filters (BPFs) allow the beacon signal to pass through into the tracking channel.

Figure 2:
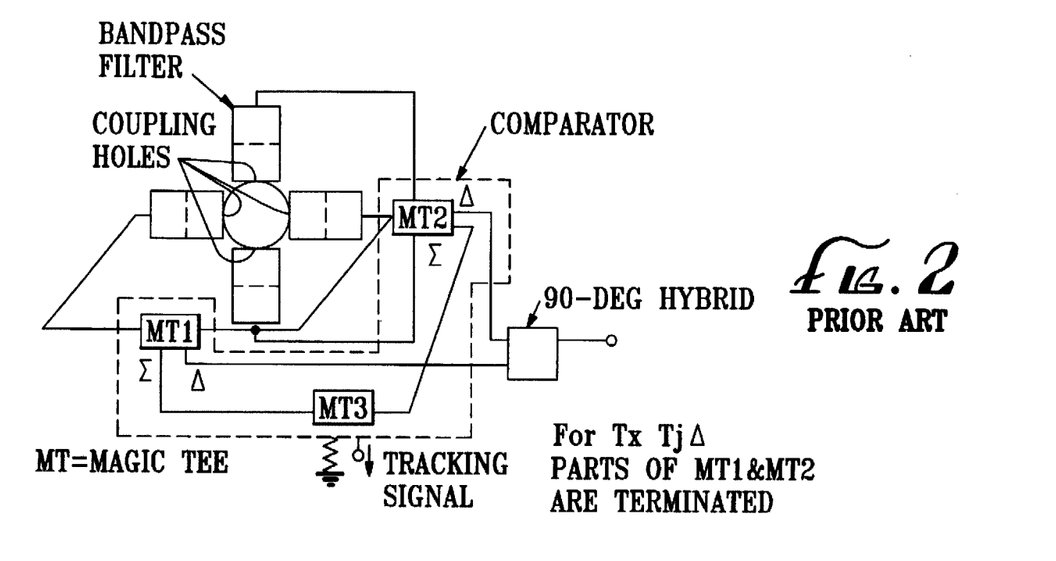
FIG. 2 illustrates a typical turnstile junction configuration.

FIG. 2 illustrates a typical turnstile junction configuration. Four bandpass filters are attached to the four sides of a waveguide manifold and connected to a comparator. The comparator consists of magic tees MT1, MT2 and MT3 interconnected to provide two linearly polarized (LP) sum signals ($\Sigma$) and one error signal ($\Delta$).

Referring to FIG. 1, the two linearly polarized sum signals from the comparator are combined into a circularly polarized (CP) sum signal using a 90°-hybrid. Circularly polarized signals include a vertically polarized (VP) component and a horizontally polarized (HP) component in phase quadrature. The (VP) component is leading or lagging the HP component by 90° depending upon whether the (CP) source is left or right handed, respectively.

A modulator driver time-multiplexes azimuth and elevation error signals. A directional coupler amplitude modulates the sum signal using the time-multiplexed error signals to generate a composite RF tracking signal.

In the data channel, the polarizer converts the data signals (F4' to F4") into circularly polarized signals. The combined CP data signals pass through the high pass filter and TJ and radiate out of the horn. The high pass filter and the TJ are transparent to the combined data signals because the frequencies F4' to F4" are in the passband of the high pass filter and in the stop-band of the BPFs.

The use of TJ in existing tracking systems requires the high-pass filter to be precisely located with respect to the TJ in order to efficiently extract the tracking signals from the main waveguide manifold. This location sensitivity constrains the existing systems to extremely narrowband tracking applications only. Consequently, existing systems can only track at a single frequency. Furthermore, the high pass filter cannot be fully impedance-matched within the entire frequency band from F4' to F4" due to the wide frequency spread from F4' to F4". Therefore, the existing systems cannot provide high polarization purity over a wide bandwidth. A polarization purity improvement by at least 2.0 dB from F4' to F4" is highly desirable.

Figure 3:
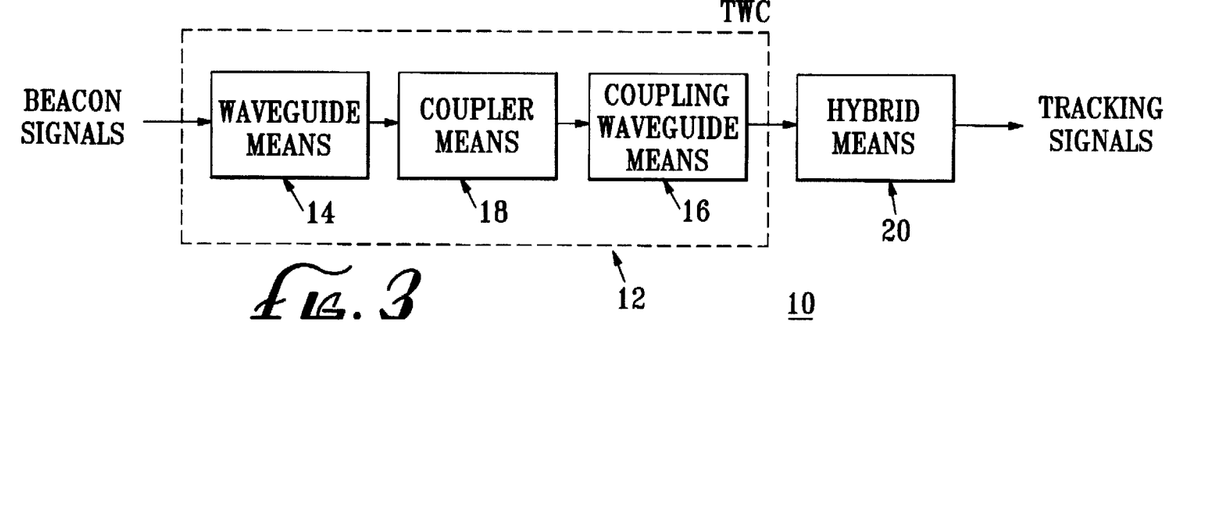
FIG. 3 illustrates a block diagram of an embodiment of a multiple-frequency autotracking system according to the present invention.

The aforementioned shortcomings of the prior art systems have been overcome by the present invention as hereinafter described. FIG. 3 illustrates a block diagram of an autotracking travelling wave coupler system 10 for generating tracking signals covering a wideband frequency range according to the present invention. The system 10 comprises a travelling wave coupler 12 including: (a) waveguide means 14 having a predetermined propagation length and a diameter sized to excite circular $TE_{11}$ and $TM_{01}$ modes of circularly polarized microwave signals covering a wideband frequency range; (b) coupling waveguide means 16 having a predetermined length for propagating signals having a phase velocity of $TE_{10}$ mode that is the same as the phase velocity of $TM_{01}$ mode in the waveguide means 14; and (c) coupler means 18 for transforming microwave energy of the $TM_{01}$ mode of the circularly polarized microwave signals into rectangular $TE_{10}$ modes in the coupling waveguide means 16; whereby, the system 10 tracks multiple signals covering a wideband frequency range and the overall length of the waveguide means 14 and the coupling waveguide means 16 is reduced in size by the parallel functions of the coupling waveguide means 16.

The system 10 further comprises 180°-hybrid means 20 for combining the $TE_{10}$ modes in the coupling waveguide means 16 in phase. The signals at the output of the 180°-hybrid means 20 consist of one or more error signals at different frequencies, each error signal including a first hybrid error signal with an azimuth component and a second hybrid error signal with an elevation component 90° or 270° in phase quadrature with the azimuth component.

FIG. 3 is a simplified block diagram showing a preferred embodiment of the system 10 including the travelling wave coupler 12, the waveguide means 14 and the coupling waveguide means 16 according to the present invention. The block diagram of the traveling wave coupler 12 of FIG. 3 preferably has a physical configuration illustrated in the perspective view of FIG. 4. In this embodiment, the waveguide means 14 includes a waveguide manifold 22, the coupling waveguide means 16 includes a pair of coupling arm waveguides 24, 26 aligned and connected to the waveguide manifold 22 along a portion of the propagation length of the waveguide manifold 22, and the coupler means 18 includes a pair of couplers 30, each located between the waveguide manifold 22 and a corresponding coupling arm waveguide.

Figure 4:
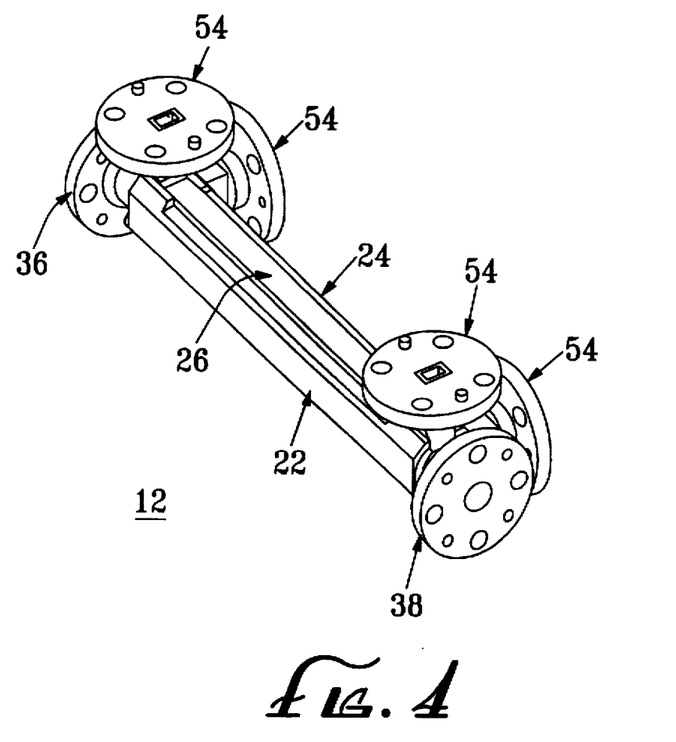
FIG. 4 is a perspective view of a traveling wave coupler according to the present invention.
Figure 5:
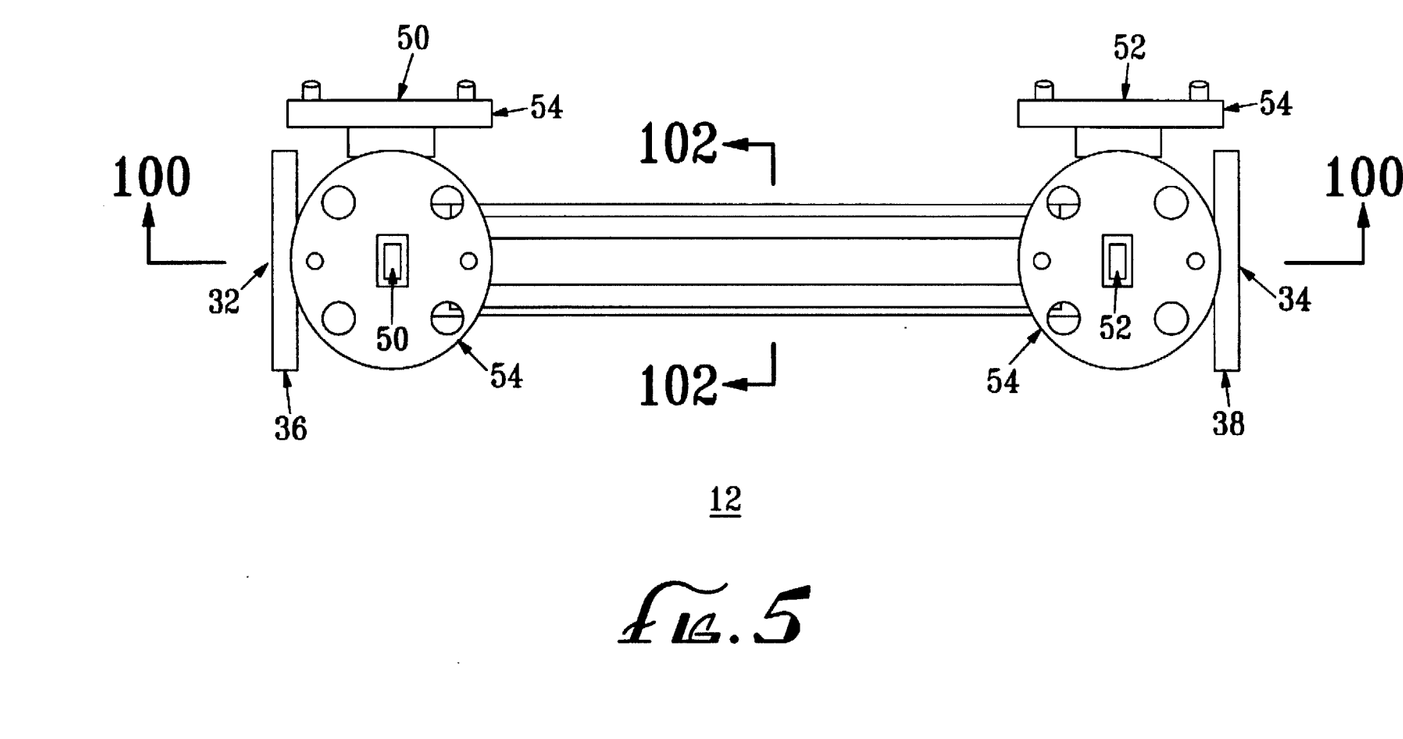
FIG. 5 is a plan view of the travelling wave coupler of FIG. 4.
Figure 6:
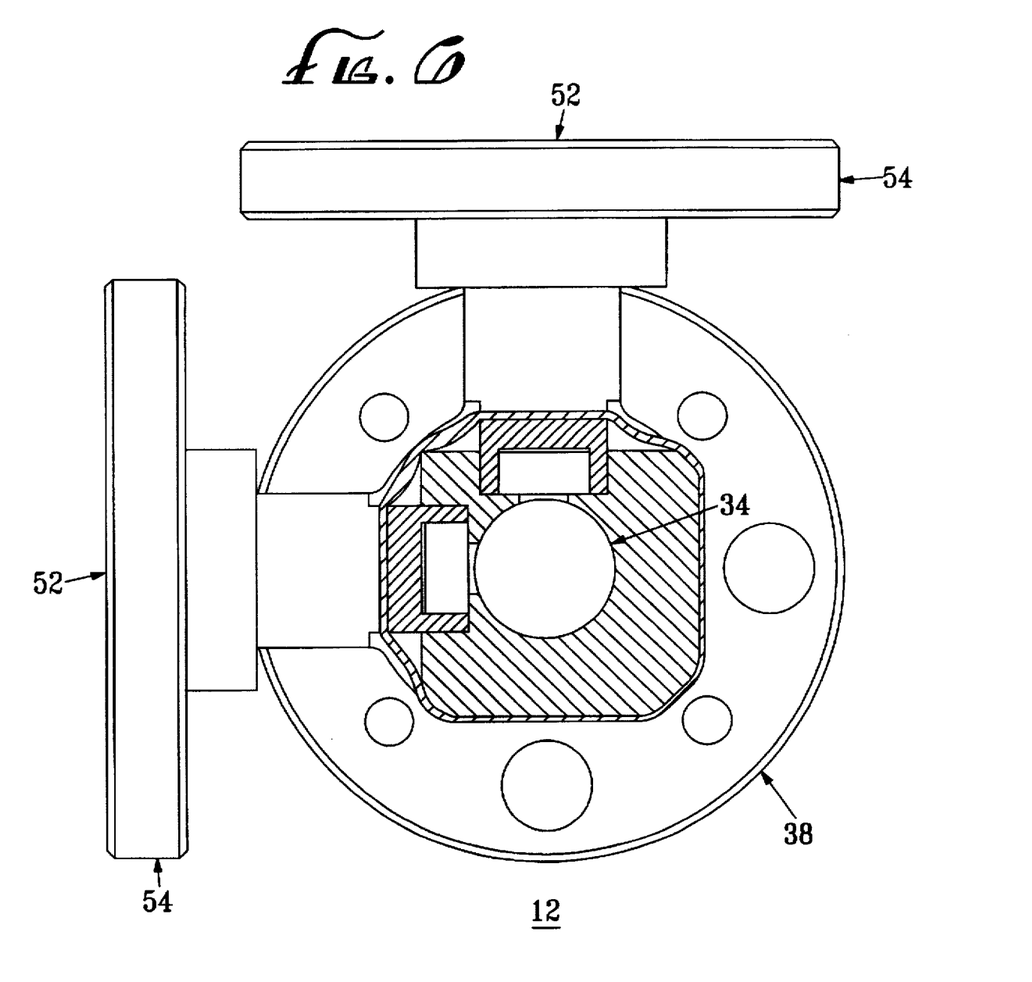
FIG. 6 is a cross-sectional view of the manifold and coupling arms taken along line 102—102 in FIG. 5.
Figure 7:
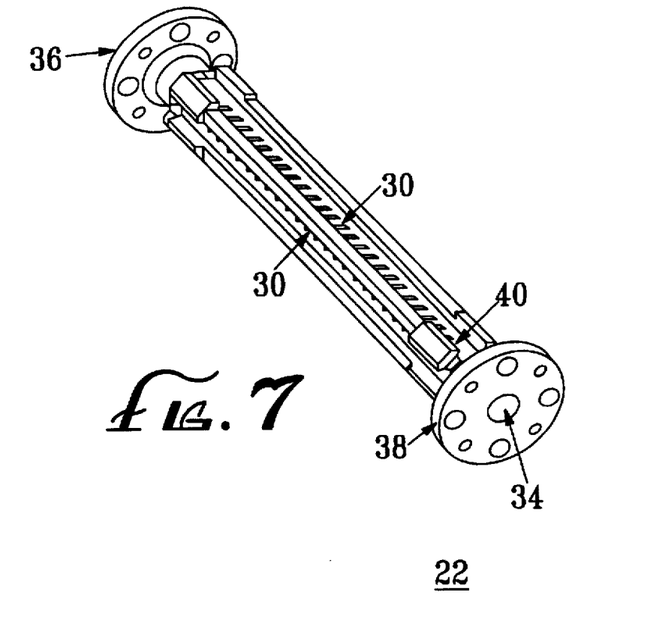
FIG. 7 is a perspective view of the waveguide manifold of the travelling wave coupler of FIG. 4.
Figure 8:
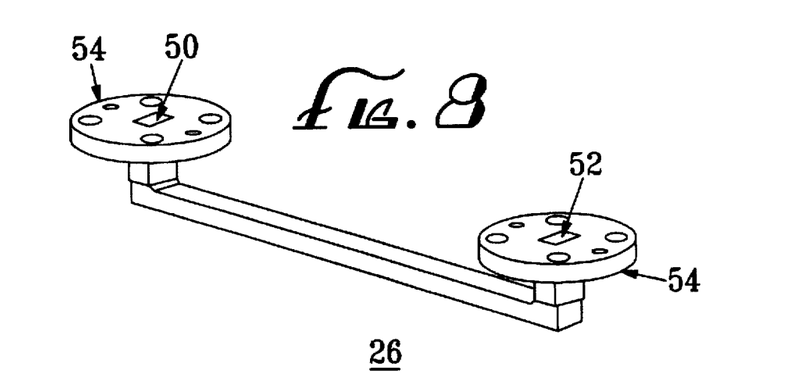
FIG. 8 is a perspective view of a coupling arm of the travelling wave coupler of FIG. 4.

As illustrated in FIG. 5, the waveguide manifold 22 of FIG. 4 includes an input port 32 and an output port 34. The input port 32 of the waveguide manifold 22 includes a first flange 36 for connection to a multimode horn and the output port 34 of the waveguide manifold 22 includes a second flange 38 for connection to a polarizer. The waveguide manifold 22 is sized to support both the circular $TE_{11}$ and $TM_{01}$ modes. For V-band applications the waveguide manifold is 0.176 inches in diameter and 3.55 inches in length. The waveguide manifold 22 has a circular cross-section while the coupling arms 24, 26 have a rectangular cross-section 0.061 inches in width and 0.115 inches in height. The coupling arms 24, 26 are dimensioned to support only the fundamental rectangular $TE_{10}$ mode, and to ensure that the phase velocity of the $TE_{10}$ mode in the coupling arms 24, 26 is the same as the phase velocity of the $TM_{01}$ mode in the waveguide manifold 22. For V-band applications the coupling arms 24, 26 are 2.67 inches long. Microwave energy of the $TM_{01}$ mode in the circular waveguide manifold 22 is easily transformed into the rectangular $TE_{10}$ mode in the coupling arms 24, 26 due to the phase velocities of the rectangular $TE_{10}$ and the circular $TM_{01}$ being the same. Microwave energy of the circular $TE_{11}$ mode is not easily transformed into the rectangular $TE_{10}$ mode due to different phase velocities of the circular $TE_{11}$ mode and the rectangular $TE_{10}$ mode.

Figure 10:
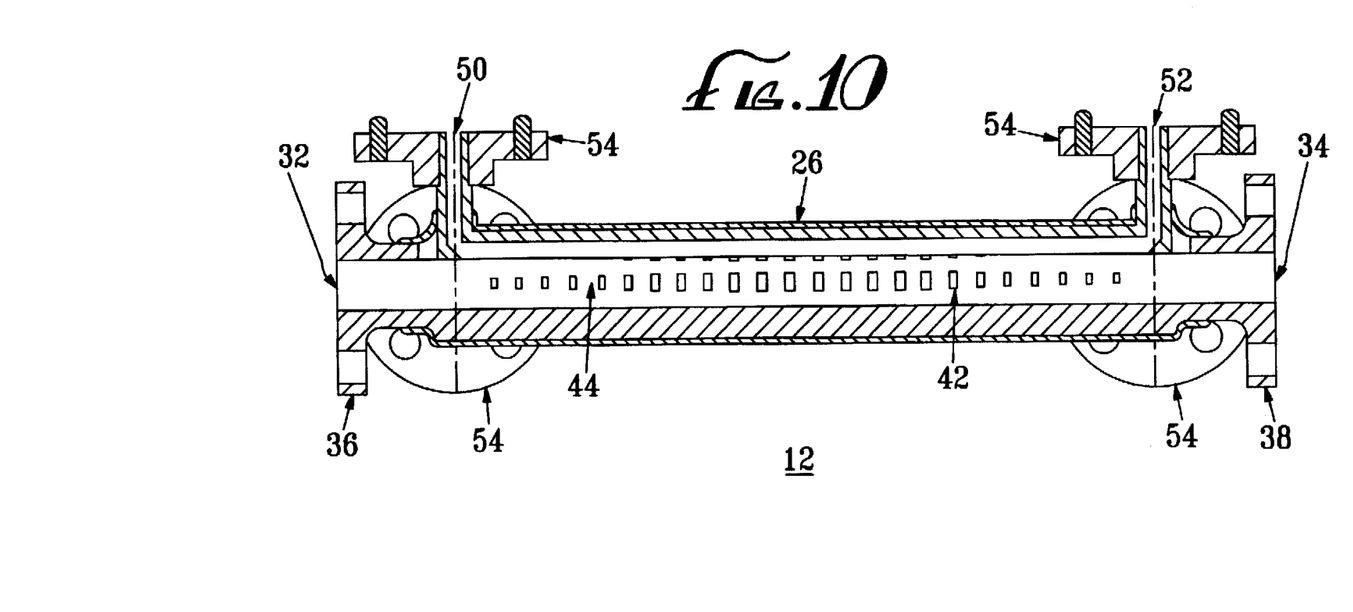
FIG. 10 is a cross-sectional view of the waveguide manifold and a coupling arm of the travelling wave coupler of FIG. 5 taken along line 100—100 in FIG. 5.

The coupling arms 24, 26 are of the same dimensions and are connected to an outer surface 40 of the waveguide manifold 22. Preferably the relative location of the coupling arms 24, 26 on the waveguide manifold 22 is about 90° from one another as shown in the drawings. Each coupler 30 in FIG. 7 includes a plurality of orifices 42 provided in common walls 44, as shown in FIG. 10, shared by the coupling arms 24, 26 and the waveguide manifold 22. The orifices 42 define coupling regions 46. Specifically, microwave energy transferred in the $TM_{01}$ mode in the circular waveguide manifold 22 is coupled into the coupling arms 24, 26 because its phase velocity is identical to that of the $TE_{10}$ mode in the coupling arms 24, 26. On the other hand, the orifices 42 cause negligible effects on the $TE_{11}$ mode if the orifice size is not excessively large (preferably, less than a fraction of waveguide wavelength). The microwave energy transferred in the $TE_{11}$ mode therefore passes through the coupling regions 46 with little leakage into the coupling arms 24, 26. The orifices 42 introduce insertion phase to the microwave energy travelling with the E-field perpendicular to the orifices 42. If the E-field is parallel to the orifices 42, the insertion phase is minimal.

Figure 9:
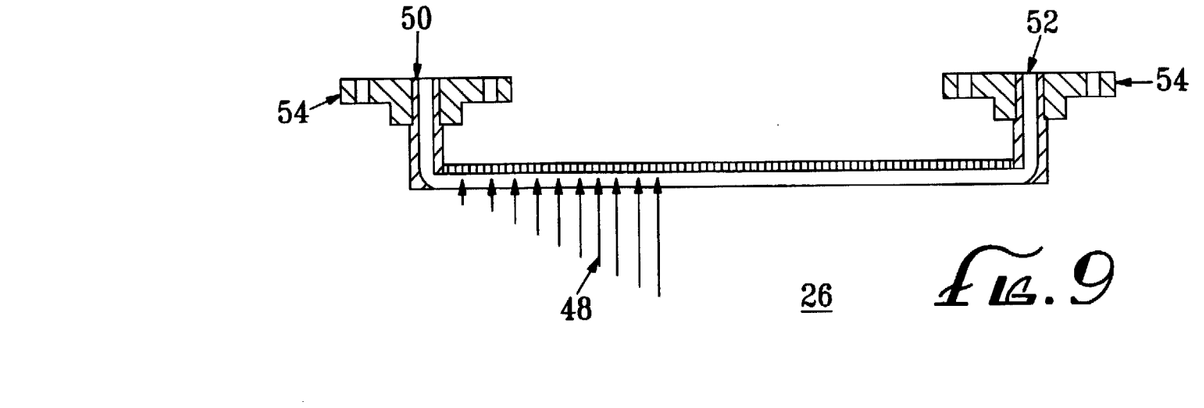
FIG. 9 is a cross-sectional view of the coupling arm of FIG. 8 taken along line 100—100 in FIG. 5.

An approximate relative distribution energy is indicated by the relative length of flow vectors 48 in FIG. 9. Maximum energy transfer occurs through the orifices 42 centered between the input port 32 and the output port 34 of the waveguide manifold 22. Minimum energy transfer occurs through the orifices 42 located adjacent the input and output ports 32 and 34, respectively, of the waveguide manifold 22

Each coupling arm 24, 26 has an input port 50 and an output port 52. The input ports 50 of the coupling arms 24, 26 terminate in matched loads, i.e. the characteristic impedance of the coupling arms 24, 26. The coupling arms 24, 26 include connecting flanges 54 adjacent their respective output ports 52.

Figures 11, 12:
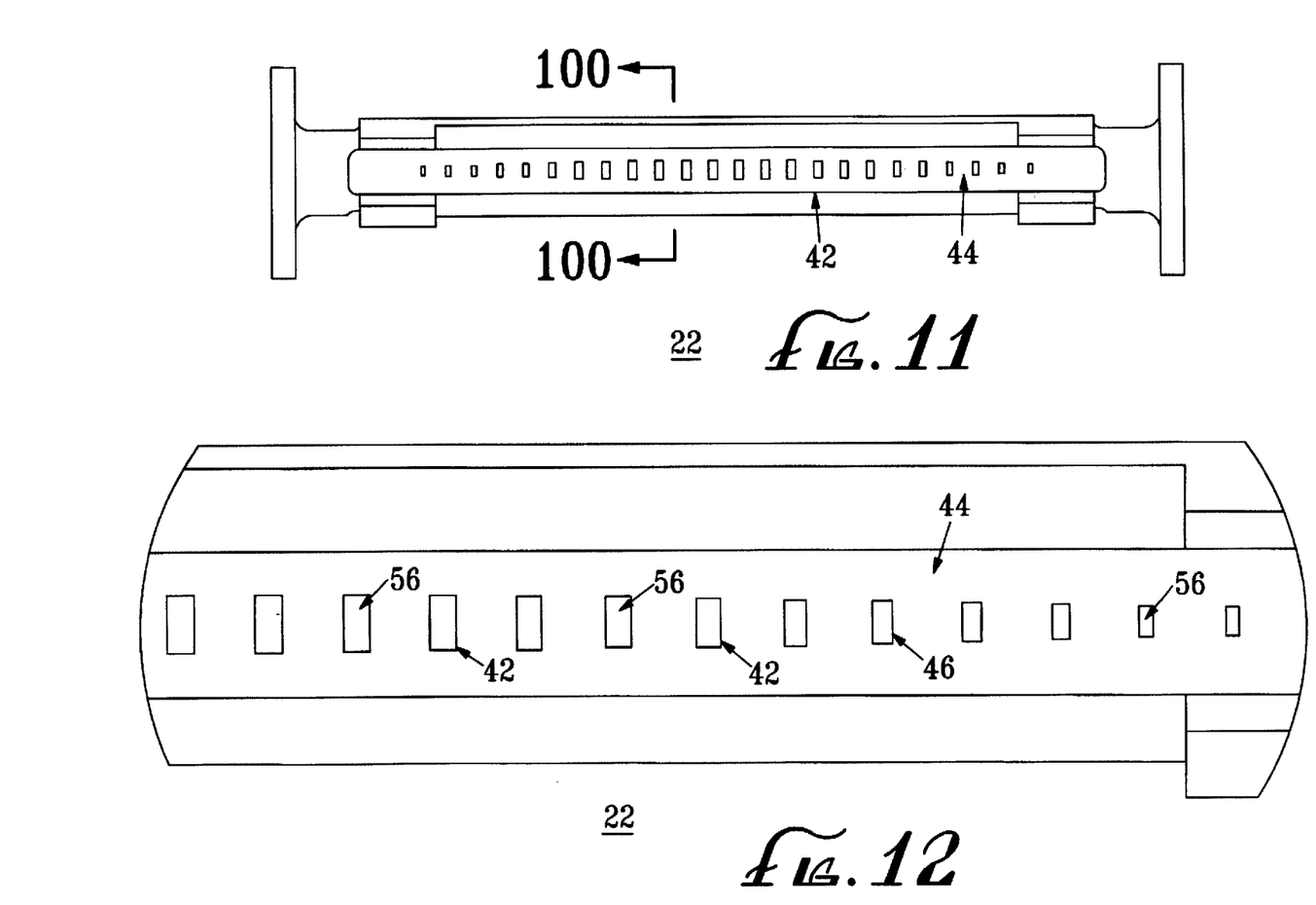
FIG. 11 is a plan view of the waveguide manifold of FIG. 7 showing one set of the coupling orifices of the travelling wave coupler.
FIG. 12; is a detailed plan view of the coupling orifices of the waveguide manifold of FIG. 11.

Referring to FIGS. 10–12 the orifices 42 defining the coupling regions 46 are shown in greater detail. The orifices 42 are rectangular in shape although other shapes, such as circular or elliptical, are also acceptable. Center points 56 of adjacent orifices 42 are preferably equally spaced. The rectangular orifices 42 preferably decrease in size from a center orifice. Alternatively two center orifices having the same dimension may be used.

In an embodiment of the present invention operating at V-band, a 3.55" circular waveguide manifold 22 is used and includes 24 orifices 42 for each coupling arm 24, 26 (two center orifices) spaced a distance 0.103". The circular waveguide manifold 22 has an inner diameter of 0.176" and operates between approximately 55 and 65 GHz. The two center orifices have a dimension of 0.0636"×0.0318" and the smallest orifices have a dimension of 0.0379"×0.0160" or greater. Preferably a maximum orifice size of 0.064" and —40 dB Bessel distribution is utilized. Shorter or longer waveguide manifolds can also be used depending on bandwidth required. As can be appreciated the above dimensions relate to traveling wave couplers operating at approximately 60 GHz. Using scaling operation can be obtained for other frequencies. At a minimum operation from 55 GHz to 65 GHz is readily obtainable through scaling.

Advantageously the orifices 42 maintain polarization purity of a circularly polarized transmission signal transmitted through the waveguide manifold 22 as described below.

Tracking

Figure 13:
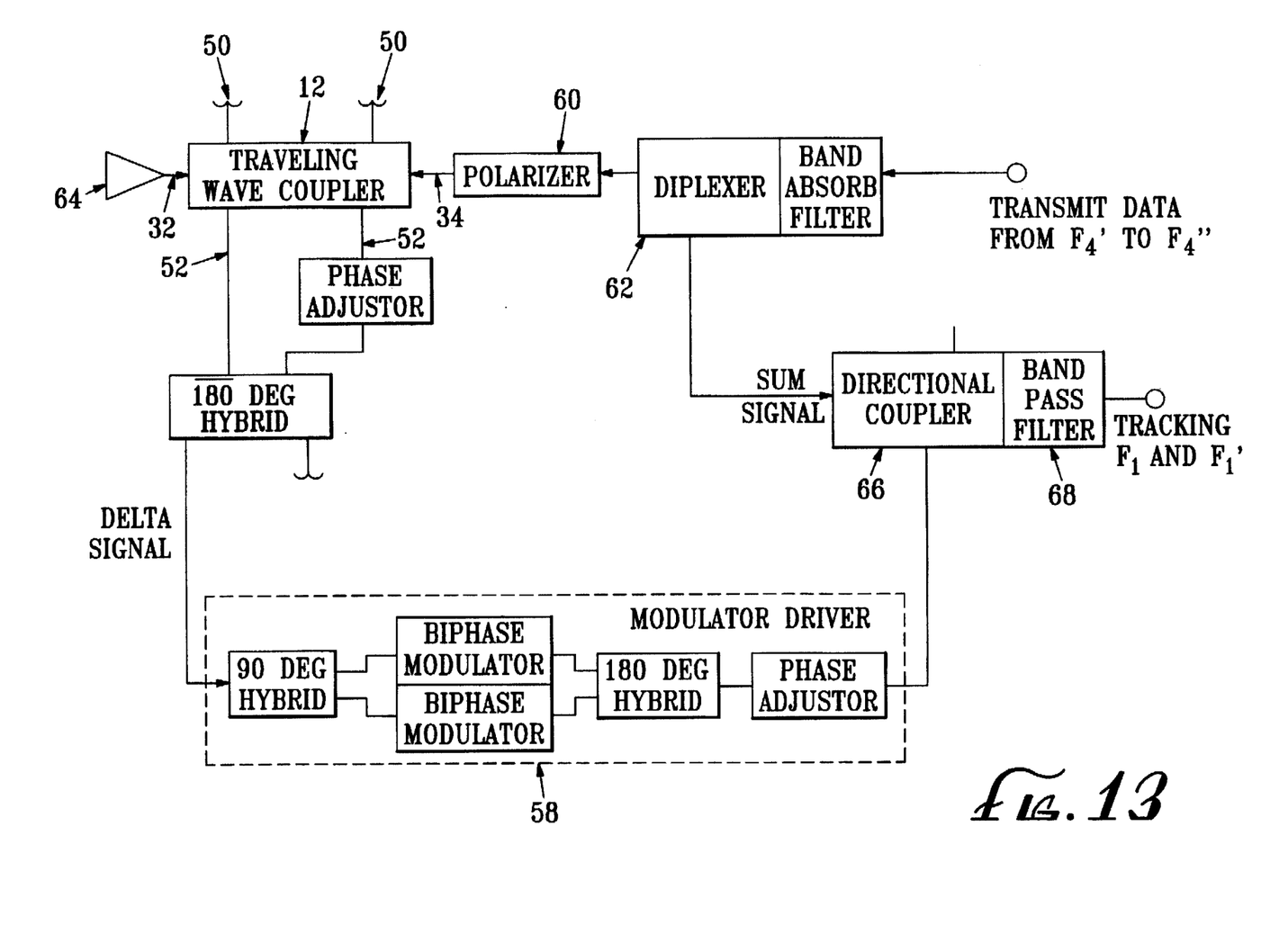
FIG. 13 illustrates a schematic diagram of an example feed assembly utilizing a two-arm travelling wave coupler according to the present invention.

FIG. 13 illustrates a schematic diagram of an example feed assembly utilizing a two-arm travelling wave coupler according to the present invention. The two-arm configuration is essential because a one-arm coupler is excessively long and causes transmit signal depolarization. The tracking signals for frequencies F1 and F1', with F1'/F as high as 1.25 and F1' less than F4, are extracted by the two-am travelling wave coupler of the present invention.

Due to the two-am TWC's wideband coupling characteristics a tracking system utilizing the two-arm TWC 12 of the present invention is capable of multiple-frequency tracking. Since the TWC uses "mode separation" (as opposed to "frequency separation" in the TJ approach) to separate the tracking signals from the data signals, a high pass filter is not needed. "Mode separation" refers to a TWC's ability to separate the tracking and the data signals based on their difference in the propagation modes: the tracking signals propagate in $TM_{01}$ mode and the data signals in $TE_{11}$ mode. The operation principle of a TWC is disclosed in U.S. Pat. No. 5,410,318 and incorporated herein by reference.

Referring to FIG. 13, two $TE_{10}$ tracking signals extracted out of ports 52 of the travelling wave coupler are combined in phase using a 180° hybrid. Ports 50 of the travelling wave coupler are terminated. As opposed to the TJ approach in FIG. 1 where the side arms produce both sum ($\Xi$) and error signals ($\Delta$), the coupling arms 24, 26 of the TWC 12 of the present invention produce only error signals ($\Delta$). The error signals out of the 180° hybrid cover the frequencies from F1 to F1' since the beacon signals cover the range between F1 and F1'. Error signals in the range F1 to F1' are being transmitted in the $TE_{10}$ mode. Each error signal has an azimuth and an elevation component which may be in phase quadrature.

The signals from the 180° hybrid are fed into a modulator driver 58 for multiplexing. The modulator time-multiplexes the signals by placing the azimuth components and the elevation components in different time slots.

The azimuth or elevation components at different frequencies can both use the same time slots. Time-slotting is performed for each of the separate signals.

The sum signal flows through a polarizer 60 and is separated from the data signals by a diplexer 62. The wideband data signals pass through the polarizer 60 and the TWC 12 and radiate out of the horn 64. The TWC 12 is transparent to the sum tracking signals (F1 to F1') and the data signals (F4' to F4") because they are traveling in the TE11 circular waveguide mode.

The sum signal and the error signals are fed to a directional coupler 66 and a band pass filter 68 to obtain tracking signals at a frequency of F1 or F1'. The tracking signals F1 and F1' are not used at the same time. For example if the travelling coupler receives a first beacon signal at the frequency F1 from one direction and a second beacon signal at the frequency F1' from another direction, an operator can select either one of the two frequencies F1 and F1' and then lock onto the respective beacon signal.

The directional coupler 66 is staggered in modulation. The sum signal is the carrier and the difference signal is the modulating signal, since it is time-multiplexed between the azimuth and elevation. As such the directional coupler 66 is modulating the sum signal (the carrier) with the error signal (the modulating signals). The band pass filter 68 keeps any noise out of the tracking signals from F1 to F1'. The amplitude signal enters the band pass filter 68 modulated. The amplitude is proportional to the error signal strength and the carrier is the sum signals.

Due to the combination of the tracking signals from the two coupling arms 24 26 the TWC length is reduced to half of a one-arm TWC while maintaining a high level $TM_{01}$ coupling from F1 to F1' and insignificant $TE_{11}$ leakage from F4' to F4". Advantageously, the two-arm travelling wave coupler is a symmetrical structure to the two orthogonal components of the wideband CP data signals. Insertion phase imbalance is reduced and wideband data can pass through the TWC 12 without significant polarization degradation.

A one-arm TWC is unsuitable for dual-frequency tracking and maintaining high polarization purity because: (1) Small orifice size must be used to prevent high frequency (close to F4") data signals from leaking into the coupling arms; (2) Small orifice size dictates the use of a large number of holes in order to obtain sufficient coupling of the tracking signals into the coupling arms; (3) Large number of orifices introduces significant insertion phase imbalance between the two orthogonal components of the CP data signals depolarizing the data signals; and (4) A TWC with a large number of coupling orifices is excessively long and cannot fit into the space available for an antenna feed assembly.

Data Transmission.

Referring to FIG. 14 in the transmit channel the transmit data signal is circularly polarized by the polarizer 60. Because of the two-arm design a very high purity of circular polarization is maintained during transmission. The two-arms provide a symmetrical configuration as viewed by the CP transmit signals at frequencies F4' to F4". If the travelling wave coupler has only one arm then the CP transmit signal is depolarized by the asymmetrical structure of the travelling wave coupler.

The orifices 42 between the waveguide manifold 22 and the coupling arms 24, 26 maintain circular polarization of the transmit signals in the waveguide manifold 22. Since a circularly polarized transmit signal has a vertical component and a horizontal component, the signal components are identically slowed down by the orifices 42. The vertical component of the CP signal is slowed down by the orifices 42 perpendicular to the vertical component, and the horizontal component of the CP signal is slowed down by the orifices 42 perpendicular to the horizontal component. If both the horizontal and vertical components are not slowed down by the same amount, the CP signal will be depolarized. With two coupling arms 24, 26 and associated orifices 42 described above, the two components of a CP signal see the same propagation environment and remain circularly polarized.

The bandwidth of F4' to F4" is much wider than that of F1 to F1'. Therefore at transmit frequency bands of F4' to F4" a high purity of circular polarization is required in order to cover the entire bandwidth. The limitation of a one-arm TWC is that the single arm, while it has the capability to track on wide tracking signals, fails to provide a good circular polarization over wideband transmit signals.

As can be appreciated, a traveling wave coupler according to the invention provides multiple-frequency tracking and maintains high data transmission polarization purity while reducing weight and cost with performance superior to conventional traveling wave couplers especially important to satellite applications which must be launched into orbit. Other features and advantages will be readily apparent.

The present invention has been described in considerable detail with reference to certain preferred versions thereof; however, other versions are possible. Therefore, the spirit and scope of the appended claims should not be limited to the description of the preferred versions contained herein.

What is claimed is:

1. A traveling wave coupler autotracking system for controlling the pointing of an antenna aboard an orbiting satellite, the system comprising:

(a) a waveguide manifold having a predetermined propagation length for exciting circular $TE_{11}$ and $TM_{01}$ modes of circularly polarized microwave signals covering a wideband frequency range;

(b) a pair of coupling arm waveguides having an equal predetermined length for propagating signals having a phase velocity of $TE_{10}$ mode that is the same as the phase velocity of $TM_{01}$ mode in the waveguide manifold; and (c) a pair of couplers for transforming microwave energy of the $TM_{01}$ mode of the circularly polarized microwave signals into $TE_{10}$ modes in the coupling arm waveguides:

whereby, the system tracks signals covering a wideband frequency range and the overall lengths of the waveguide manifold and of the coupling arm waveguides are reduced in size by the parallel functions of the coupling arm waveguides.

2. The system of claim 1 wherein each coupling arm waveguide is aligned and connected to the waveguide manifold along a portion of the propagation length of the waveguide manifold.

3. The system of claim 2 wherein each coupler is located between the waveguide manifold and a corresponding coupling arm waveguide.

4. The system of claim 1 wherein each coupler includes a wall, common to both the waveguide manifold and the coupling arm waveguide, the wall having a plurality of orifices each with a center which is equally spaced from a center of an adjacent orifice.

5. The system of claim 4 wherein the orifices in said walls are rectangles.

6. The system of claim 4 wherein the orifices in said walls are elliptical.

7. The system of claim 4 wherein the orifices are largest at a center of the length of the waveguide manifold, are smallest adjacent opposing ends of the length of the waveguide manifold, and incrementally decrease in size from the center to the opposing ends of the waveguide manifold.

8. The system of claim 4 wherein the orifices maintain polarization purity of a circularly polarized transmission signal transmitted through the waveguide manifold.

9. The system of claim 4 wherein the orifices in said walls are circular.

10. The system of claim 1 further comprising 180°-hybrid means for combining the $TE_{10}$ modes in the coupling arm waveguides in phase and for generating one or more error signals at different frequencies, each error signal including a first hybrid error signal with an azimuth component and a second hybrid error signal with an elevation component 90° or 270° in phase quadrature.

11. An autotracking system for controlling the pointing of an antenna aboard an orbiting satellite, the system comprising:

(a) a waveguide manifold having a predetermined propagation length for exciting circular $TE_{11}$ and $TM_{01}$ modes of circularly polarized microwave signals covering a wideband frequency range;

(b) a pair of coupling arm waveguides each having a predetermined length for propagating signals having a phase velocity of $TE_{10}$ mode that is the same as the phase velocity of $TM_{01}$ mode in the waveguide manifold, each coupling arm waveguide being aligned and connected to the waveguide manifold along a portion of the propagation length of the waveguide manifold; and (c) a pair of couplers for transforming microwave energy of the $TM_{01}$ mode of the circularly polarized microwave signals into $TE_{10}$ modes in the coupling arm waveguides, each coupler located between the waveguide manifold and a corresponding coupling arm waveguide;

whereby, the system tracks signals covering a wideband frequency range and the overall length of the waveguide manifold and the coupling arms is reduced in size by the parallel functions of the coupling arms.

12. The system of claim 11 further comprising 180°-hybrid means for combining the $TE_{10}$ modes in the coupling arm waveguides in phase and for generating one or more error signals at different frequencies, each error signal including a first hybrid error signal with an azimuth component and a second hybrid error signal with an elevation component 90° or 270° in phase quadrature.

13. The system of claim 12 wherein each coupler includes a wall, common to both the waveguide manifold and the coupling arm waveguide, the wall having a plurality of orifices each with a center which is equally spaced from a center of an adjacent orifice.

14. The system of claim 13 wherein the orifices are largest at a center of the length of the waveguide manifold, are smallest adjacent opposing ends of the length of the waveguide manifold, and incrementally decrease in size from the center to the opposing ends of the waveguide manifold.

15. The system of claim 14 wherein the orifices maintain polarization purity of a circularly polarized transmission signal transmitted through the waveguide manifold.

* * * * *